United States Patent [19]
Best et al.

[11] Patent Number: 5,478,047
[45] Date of Patent: Dec. 26, 1995

[54] FLEXIBLE SEATING STRUCTURE FOR VALVES

[75] Inventors: William J. Best, Naperville; Joseph W. Hoff, Bolingbrook; Stephen J. Smick, Oswego; James A. Skurka, Niles, all of Ill.

[73] Assignee: Watts Investment Company, Wilmington, Del.

[21] Appl. No.: 441,669

[22] Filed: May 15, 1995

Related U.S. Application Data

[63] Continuation of Ser. No. 336,568, Nov. 9, 1994, abandoned, which is a continuation of Ser. No. 192,564, Feb. 7, 1994, abandoned.

[51] Int. Cl.$^6$ ............................................. F16K 5/06
[52] U.S. Cl. ..................... 251/172; 251/171; 251/315.08
[58] Field of Search ................................ 251/315, 315 R, 251/314, 316, 315.08, 170, 171, 172

[56] References Cited

U.S. PATENT DOCUMENTS

| | | | |
|---|---|---|---|
| 3,394,915 | 7/1968 | Gachot | 251/315 RC X |
| 3,447,781 | 6/1969 | Fawkes | 251/315 |
| 3,584,641 | 6/1971 | Milleville | 251/315.08 X |
| 3,848,849 | 11/1974 | Alexander | 251/314 |
| 3,895,776 | 7/1975 | Laurens | 251/315 RC X |
| 4,286,614 | 9/1981 | Kacal et al. | 251/315.08 X |
| 4,519,412 | 5/1985 | Grazioli | 251/316 X |
| 5,069,240 | 12/1991 | Kurkjian, Jr. | 251/315 RC X |

OTHER PUBLICATIONS

Drawing C–S03143G, by M. E. M. of Henry Pratt Co. (dated Jul. 14, 1992).
Drawing C–S06400B, by V. A. of Henry Pratt Co. (dated Feb. 2, 1993).

*Primary Examiner*—John C. Fox
*Attorney, Agent, or Firm*—Fish & Richardson

[57] ABSTRACT

A rotary valve has a valve housing with a wall defining a flow passageway, a closure member journalled within the valve housing and mounted for movement between a first position for permitting flow of fluid within the flow passageway and a second position for ceasing flow of fluid within the flow passageway, and a flexible seating ring disposed at least partially within the flow passageway in a position for sealing engagement with the closure member in second position. The flexible seating ring has a flow-through section sized to fit within the flow passageway with a clearance fit, and a flanged seating section extending outwardly from the flow-through section and positioned for sealing contact with the closure member to seal the valve. A seating ring support member is positioned to support the seating ring in a manner to permit the seating ring to move axially and radially within the flow passageway to provide improved tolerance to dimensional variation in manufacture.

17 Claims, 3 Drawing Sheets

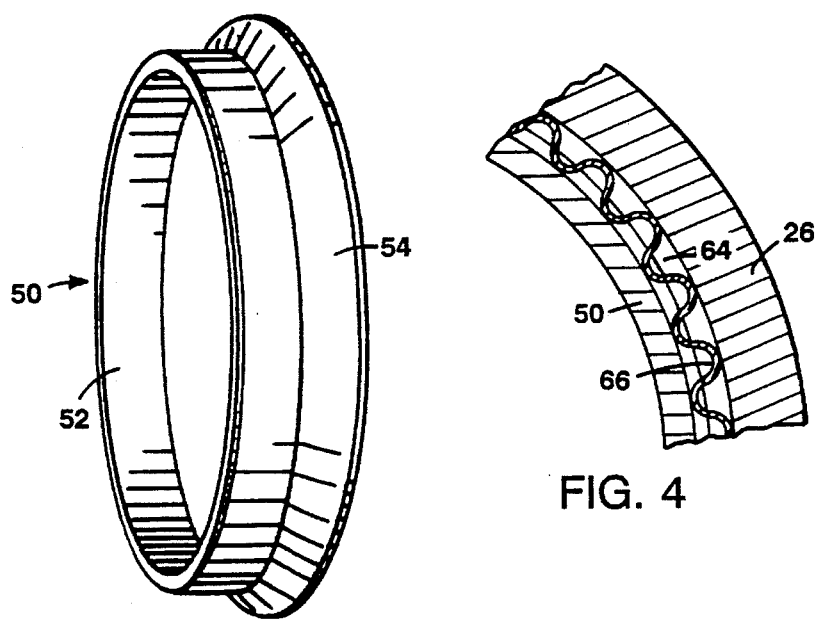
FIG. 2
FIG. 4
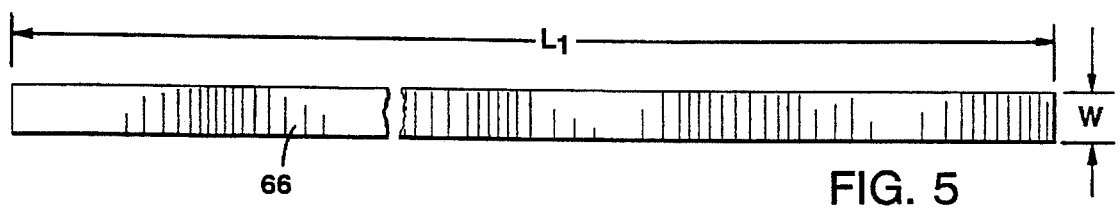
FIG. 5
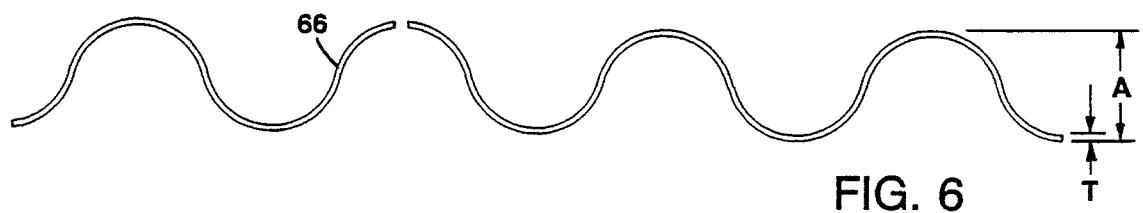
FIG. 6

FLEXIBLE SEATING STRUCTURE FOR VALVES

This is a continuation of application Ser. No. 08/336,568, filed Nov. 9, 1994, now abandoned which is a continuation of Ser. No. 08/192,564, filed Feb. 7, 1994, now abandoned.

BACKGROUND OF THE INVENTION

The invention relates to flexible seating structures for valves, e.g. rotary valves.

A rotary valve, e.g. a ball or butterfly valve, typically has a closure member which, in a first (open) position, allows fluid to pass through a valve passageway and which, in a second (closed) position, prevents fluid from flowing through the valve passageway. The closure member typically has a sealing surface, typically rounded or spherical, and flow is prevented in the second position by sealing engagement of the sealing surface of the closure member with a corresponding seating surface of the valve.

In common, everyday valves (not necessarily rotary valves), such as those present in a household water faucet, the seating surface is often provided by a soft, resilient material such as rubber or silicone. Tight contact is achieved by pressing the closure member into the soft seating material in a manner to deform the seating material to fit the contours of the closure member.

In many valve applications, however, such as where corrosive or abrasive conditions are present, it is necessary to provide a metal seating surface, which has a more limited capability to deform to fit the contours of the closure member. As a result, a high degree of precision is typically required in manufacture and assembly of valve components in order to ensure that the closure member makes continuous, sealing contact with the seating surface. Such high precision is often difficult and expensive to achieve and/or maintain. As a result, it is well recognized in the industry that metal-seated rotary valves are, in many instances, prone to leakage with poor sealing.

SUMMARY OF THE INVENTION

According to the invention, a rotary valve comprises a valve housing having a wall defining a flow passageway, a closure member journalled within the valve housing and mounted for movement between a first position for permitting flow of fluid within the flow passageway and a second position for ceasing flow of fluid within the flow passageway, a flexible seating ring, disposed at least partially within the flow passageway in a position for sealing engagement with the closure member in the second position, the flexible seating ring comprising a flow-through section sized to fit within the flow passageway with a clearance fit, and a flanged seating section extending outwardly from the flow-through section and positioned for sealing contact with the closure member to seal the valve, and a seating ring support member positioned to support the seating ring in a manner to permit the seating ring to move axially and radially within the flow passageway to provide improved tolerance to dimensional variation in manufacture.

Preferred embodiments of the invention may include one or more of the following additional features. The closure member and flanged seating section have spherical seating surfaces to provide spherical-surface-to-spherical-surface sealing contact. Alternatively, the flanged seating section has a conical inner surface to provide spherical-surface-to-conical-surface sealing contact. The seating ring is metal, preferably, e.g., heat treated and tempered stainless steel, and in many applications is hard coated and/or formed of non-galling and wear-resistant materials. When hard coated, the seating section is coated with an abradable break-in sealing layer. The closure member comprises a spherical metal seating surface which, in many applications, is hard coated and/or formed of non-galling and wear-resistant materials. When hard coated, the seating surface is coated with an abradable break-in sealing layer.

The seating ring support member comprises a wave spring. The seating ring support member is disposed between the flow-through section and the wall defining the flow passageway. The seating ring support member is a wave spring disposed between the flow-through section and the wall defining the flow passageway.

The rotary valve further comprises a sealing member encircling the seating ring in a manner to resist leakage flow between the valve housing and the seating ring. Preferably, the valve housing has an annular notch encircling the flow passageway, the notch configured to receive the sealing member. More preferably, the valve housing defines a fill port in communication between the annular notch and the exterior of the valve housing for receiving a charge of a liquified, curable composition to preload the sealing member against the seating ring. The seating ring and the sealing member are disposed relative to the closure member in a manner whereby differential fluid pressure serves to bias the flanged section against the closure member. The rotary valve further comprises a retaining ring affixed to the valve housing in a manner to resist excessive axial movement of the seating ring.

The invention thus provides a valve seat assembly suited for use, e.g., in rotary valves such as ball valves and butterfly valves, in which the valve seat "floats", i.e. the valve seat is mounted with freedom to move axially or radially in a manner to allow the seating surface to find proper contact against the valve closure member. The floating nature of the seating ring, coupled with the spherical-surface-to-spherical-surface contact of the seating surfaces, accommodates a wider range of manufacturing or assembly dimensional tolerances, as the seating ring moves within the flow passageway until it finds the appropriate contact against the closure member. Furthermore, the valve seat assembly of the invention accommodates a degree of misalignment during operation of the actuator. The ability of the seating ring to make proper contact is enhanced by preloading the sealing member against the seating ring; the amount of preloading can be tailored to the design operating pressure of the valve. Differential fluid forces on opposite sides of the flanged seating section also advantageously bias the flanged section of the seating ring against the closure member. The configuration has the distinct advantage of being relatively leak-tight through a wide range of operating pressures ranging from the design operating point down to nearly 0 psig.

Other features and advantages will be apparent from the following description of a presently preferred embodiment, and from the claims.

BRIEF DESCRIPTION OF THE DRAWINGS

FIG. 2 is a perspective view of the flexible seating ring of FIG. 1;

FIG. 4 is similar enlarged sectional view taken at the line 4—4 in FIG. 3; and

FIGS. 5 and 6 are diagrammatic side and plan views, respectively, of the wave spring, e.g., of FIG. 4.

DESCRIPTION OF THE PREFERRED EMBODIMENTS

Figure 1:
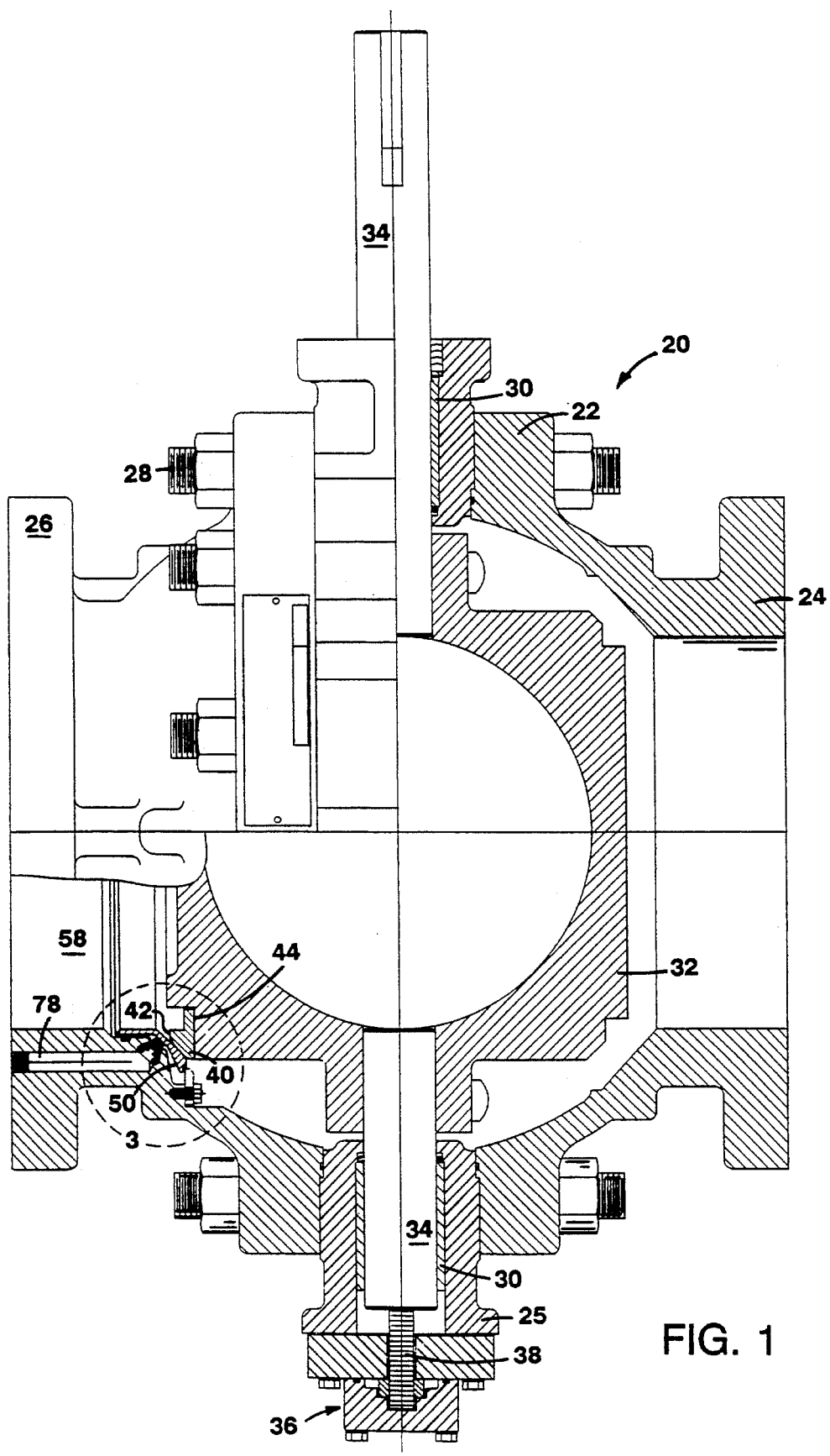
FIG. 1 is a side view, partially in section, of a ball valve with a floating, flexible seating ring of the invention.

Referring to FIG. 1, a rotary ball valve 20 having a flexible, floating seating ring of the invention consists generally of a body 22 having a first end body portion 24, a center body portion 25 and a second end body portion 26, all fastened together by suitable threaded fasteners 28. A closure ball member 32 having axially aligned valve shafts 34 is rotatably journalled by bearings 30 mounted within the center body portion 25. A thrust bearing assembly 36 mounted at the bottom of the center body portion 25 is connected thereto by stud 38 fastened to the bottom of valve shaft 34. Metallic, ring-shaped seating member 40, which provides a spherical seating surface 42, is affixed to shoulder surface 44 of ball member 32.

Figure 3:
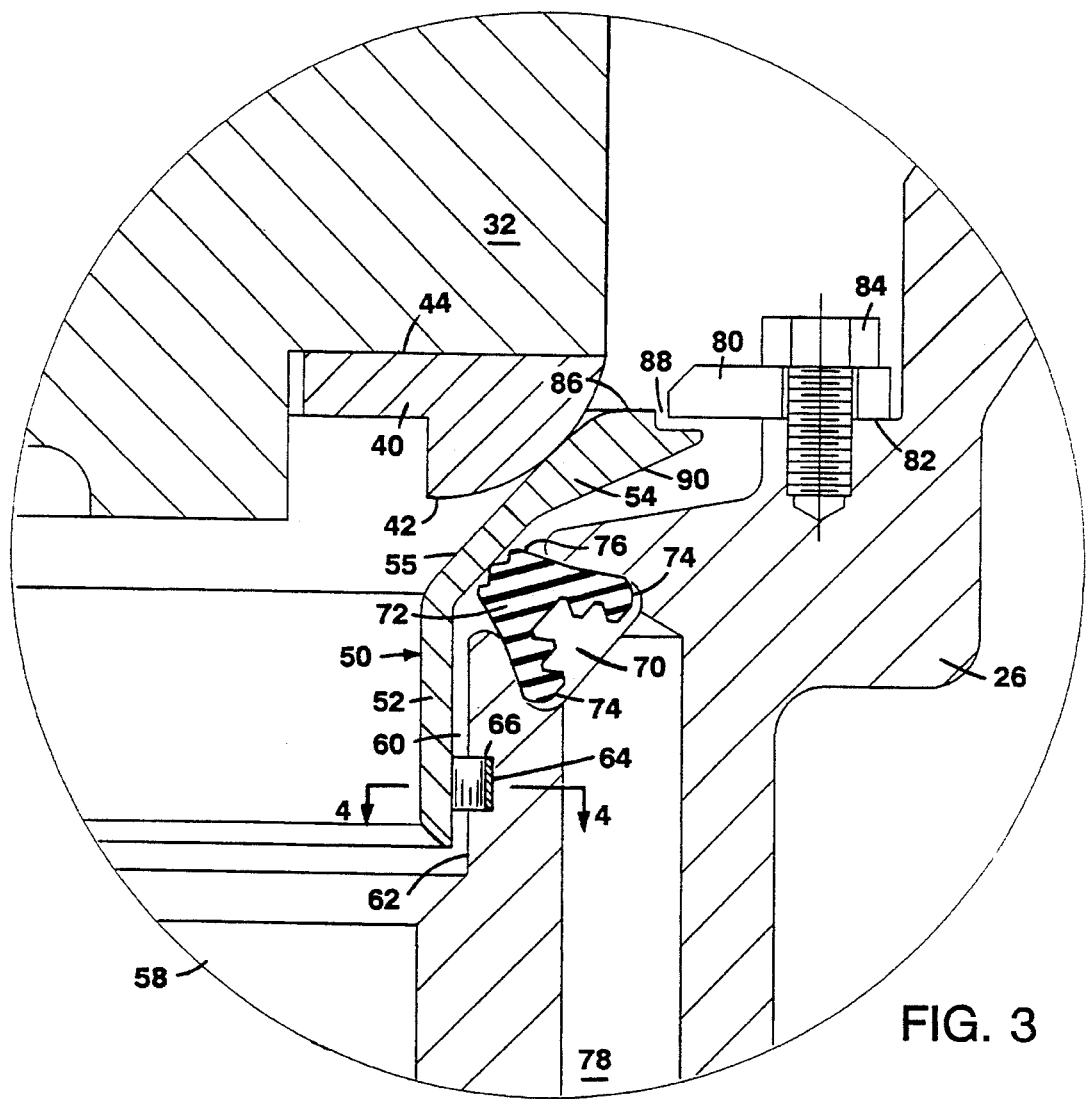
FIG. 3 is an enlarged sectional view of the region 3—3 of FIG. 1.
Figure 3A:
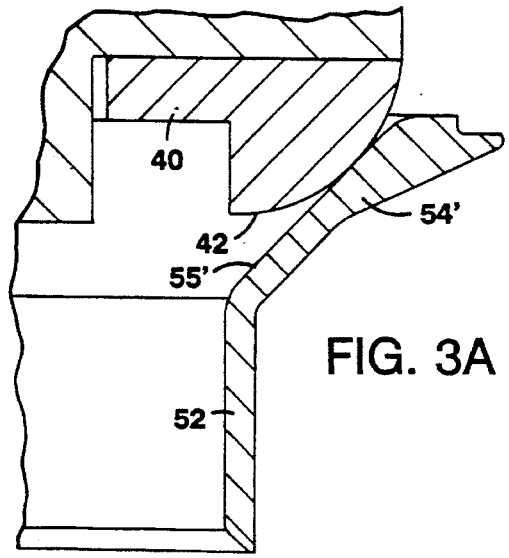
FIG. 3A is an enlarged sectional view showing a modified embodiment of the seating ring of FIG. 3.

Referring also to FIGS. 2 and 3, floating, flexible seating ring 50 has a thin, flexible, ring-shaped metal structure with a cylindrical flow-through section 52 and frustrum-like flange section 54. The inner, seating surface 55 defined by flange section 54 is generally conical in shape, but with convex spherical rounding to maintain a continuous circle of "spherical-surface-to-spherical-surface" contact with seating surface 42 when valve 20 is closed. Alternatively, it may sometimes be sufficient, or even desirable, to leave the inner seating surface 55' flat, as shown in FIG. 3A, such that it makes spherical-surface-to-conical-surface contact with seating surface 42.

The thickness of flexible seating ring 50 is selected on the basis of the size of valve 20, with the ring 50 being thick enough to sustain handling during assembly and to achieve the proper seating force when in use, yet thin enough to provide flexibility and resiliency during sealing operation. For example, an 18 inch diameter 410 stainless steel seating ring, heat treated and tempered to Rc40, is on the order of 0.156 inches thick.

Referring again to FIGS. 1 and 3, valve exit passageway 58, near the sealing region where the valve 20 seals fluid flow, is provided with an annular undercut region 60 defined by undercut surface 62. The outer diameter of the cylindrical flow-through section 52 of flexible seating ring 50 is slightly smaller than the diameter of undercut surface 62 to provide a clearance fit between cylindrical flow-through section 52 of the seating ring and the undercut surface 62 of region 60. For example, for an 18 inch valve, surface 62 would have a diameter of 18.426 inches, while flow-through section 52 would have an outer diameter of 18.341 inches, having a 0.042 inch clearance gap.

A small, annular groove 64 defined in the undercut surface 62 is sized and configured to receive a sinusoidal wave spring 66. Referring also to FIG. 4, the wave spring 66 serves to hold and support flexible seating ring 50 substantially coaxially within undercut region 60, while allowing the flexible seating ring 50 to "float", i.e., the cylindrical flow-through section 52 of the seating ring 50 is permitted to slide axially along wave spring 66 and/or to move radially by compression of wave spring 66. This floating action results in improved sealing performance of valve 20, as described more fully below.

A ball member 32 is mounted eccentrically with respect to the axis of valve shafts 34 such that, as ball member 32 is rotated into the closed position, its seating member 40 moves into engagement with the surface of flange section 54 of flexible seating ring 50. (Where the valve is a double-seat valve, i.e., one with seats at both the inlet and outlet sides of the valve, the ball member can be centrally, non-eccentrically mounted, making constant engagement with seating surface 55.) The cylindrical flow-through section 52 of the seating ring 50 slides upon the wave spring 66; as a result, once seating surface 42 contacts seating surface 55, the seating surface 55 is permitted to follow the seating surface 42 as ball member 32 rotates to the closed position. (In general, seating surface 55 will follow seating surface 42 over a greater angular range than in previously known rotary valves.) Furthermore, the cylindrical flow-through section 52 of seating ring 50 is mounted to move slightly radially by compression of wave spring 66. Thus, by its floating action, the flexible seating ring 50 of the invention can compensate for relative axial and radial misalignment of ball element 32, thereby to accommodate a considerable range of dimensional variation or tolerance, e.g. as may occur during manufacture.

For continuous, proper operation of valve 20, it is recognized as critical that wave spring 66 does not permanently deform and "take a set". Thus, the material from which spring 66 is formed, and its configuration and dimensions, are carefully selected. A wave spring 66 for use in an 18-inch (inlet and outlet diameter) valve, e.g., is shown in FIGS. 5 and 6, where the wave spring is typically formed of Grade 17-7 stainless steel with a length, L, of about 59 inches (planar projection), thickness, T, of about 0.076 inch and width, W, of about 0.25 inch. The wave spring shown has 15 sinusoidal waves, with a peak-to-trough amplitude, A, of about 0.32 inch.

The dimensions of groove 64 are similarly important. For example, for the typical 18-inch valve described above, the diameter of undercut surface 62 is about 18.43 inches, and groove 64 has a depth of about 0.17 inch and a width of about 0.30 inch to allow wave spring 66 to flex freely.

While these dimensions are exemplary for an 18-inch valve, modification for valves of other size would obviously be required to maintain proportionality. The key requirement, however, is that wave spring flex freely within the groove without permanent deformation.

Referring again to FIG. 3, an annular notch 70 is formed, e.g. by machining, in the sealing region of the left end body portion 26. The width of the notch 70 increases outwardly from the interior of valve 20 to receive a rubber sealing ring 72 of similar V-shaped profile. The rubber sealing ring 72 is preferably formed of Nitrile rubber. Alternatively, depending on the anticipated conditions of valve operation, e.g., extreme temperature or corrosive conditions, rubber sealing ring 72 may be formed of Viton or ethylene propylene. In the preferred embodiment, the rubber sealing ring 72 is formed of a material capable of withstanding operating temperatures ranging from below freezing to 200° F., e.g., Nitrile Rubber.

The resilient nature of rubber sealing ring 72 provides for radial motion of flexible seating ring 50, as does the compressibility of wave spring 66 as described above.

Two diametrically opposed fill ports 78 in communication between notch 70 and the exterior of valve 20 permit injection of a pre-loading charge of liquid epoxy into notch 70 to bias rubber sealing ring 72 inwardly towards the interior of valve 20.

Flange section 54 of flexible seating ring 50 flares outwardly towards the central region of the valve 20, to thereby overly rubber sealing ring 72. Retaining ring 80, affixed to shoulder surface 82 with fasteners 84, slightly overlaps the free edge 86 of flange section 54, thus to prevent flexible seating ring 50 from floating axially to a point where it can become dislodged from support wave spring 66, especially when ball member 32 is in the open position.

In assembly, wave spring 66 is positioned in groove 64. The rubber sealing ring 72 is then inserted into notch 70 by pinching legs 74 together, inserting them into notch opening 76, and allowing them to spring back to their original position so as to retain rubber sealing ring 72 in notch 70. The flexible seating ring 50 may then be positioned within undercut region 60 by sliding cylindrical flow-through section 52 through wave spring 66. Retaining ring 80 is then fastened to shoulder surface 82 to overlap free edge 86 of flange section 54. Ball element 32 is rotated to the closed, or sealing position, and left end piece 26 is connected to center body piece 25 to bring seating surface 42 of seating member 40 into sealing contact with the inner, seating surface 55 of flange section 54.

Liquid epoxy is injected under controlled pressure into notch 70 through fill ports 78 and allowed to harden in position. The liquid injection pressure of the epoxy must be controlled, by external means, as a function of the operating pressure of the valve. For example, a 150 psig operating pressure valve should have the epoxy injected at 65 psig.

The epoxy injected into notch 70 during the assembly process serves to bias rubber sealing ring 72 against flexible seating ring 50. Upon curing, the epoxy continues to urge rubber sealing ring 72 into engagement with the flexible sealing member 50, thus to provide a preload on rubber sealing ring 72 equivalent to the original epoxy pressurization. This preloading has a dual function. That is, as may be appreciated from FIG. 3, preloading the rubber sealing ring 72 enhances its sealing performance to prevent fluid from leaking past flexible seating ring 50, between flange section 54 and left end body portion 26, through gap 88 between retaining ring 80 and free edge 86 of flange section 54. Additionally, sealing action of the valve is obtained through sealing contact of the seating surface 42 of seating member 40 with the seating surface 55 of flange section 54; and the epoxy-generated preload serves to urge rubber sealing ring 72 against flange section 54 which, in turn, enhances the contact engagement between seating surface 42 and seating surface 55. This improves the overall sealing performance of valve 20.

Sealing performance is further enhanced by the pressure of the fluid between flange section 54 and left end body portion 26. A relatively larger amount of surface area on the back surface 90 of flange section 54, i.e., the area between free end 86 and rubber sealing ring 72, is exposed to the fluid pressure, as compared to the inner, seating surface 55. Thus, contact between seating surface 42 and seating surface 55 is further increased.

The increased contact force between seating surface 42 and seating surface 55, as well as the tendency noted above for seating surface 55 to follow seating surface 42 over increased angular ranges, create a relatively greater potential for wear and galling of the opposed seating surfaces. In order to resist these undesirable effects, seating surface 55 and/or seating surface 42 are coated, e.g., with a Tungsten-Chromium-Carbide coating. Alternatively, spherical seating member 40 and flexible seating ring 50 can be made of wear resistant materials, e.g., 316 stainless steel for one part and Monel Alloy 400 for the other.

Where the surfaces are coated, some slight seal leakage may occur due to unevenness of the coating. To prevent such leakage, a thin layer of Teflon® can be applied over the hard-coating to form a "break-in" sealing layer. The Teflon® is relatively soft, compared to the hard coating, and will mask coating imperfections. As the valve is cycled through its first 50 to 100 closures, the Teflon® will be abraded away from the coating rough spots, leaving a very smooth, leak-tight surface.

The floating, flexible seating structure described herein may be used in other rotary valves, such as butterfly valves. Other embodiments are within the scope of the following claims.

What is claimed is:

1. A rotary valve comprising
a valve housing having a wall defining a flow passageway,
a closure member journalled within said valve housing an mounted for movement between a first position for permitting flow of fluid within said flow passageway and a second position for ceasing flow of fluid within said flow passageway,
a flexible seating ring, disposed at least partially within said flow passageway in a position for sealing engagement with said closure member in said second position, said flexible seating ring comprising a flow-through section sized to fit within said flow passageway with a clearance fit, and a flanged seating section extending outwardly from said flow-through section and positioned for sealing contact with the closure member to seal the valve,
a seating ring support member positioned to support said seating ring in a manner to permit said seating ring to move axially and radially within said flow passageway, when said rotary valve is assembled and in operation, to provide improved tolerance to dimensional variation in manufacture, said seating ring support member resiliently applying a radially-directed force against said seating ring while allowing independent movement of said seating ring in the axial direction, said seating ring support member comprising a wave spring, and
a distinct sealing member encircling said seating ring in a manner to resist leakage flow between said valve housing and said seating ring.

2. The rotary valve of claim 1 wherein said closure member comprises a spherical seating surface and said flanged seating section comprises a spherically rounded seating surface to provide spherical-surface-to-spherical-surface sealing contact.

3. The rotary valve of claim 1 wherein said closure member comprises a spherical seating surface and said flanged seating section comprises a conical seating surface to provide conical-surface-to-spherical-surface sealing contact.

4. The rotary valve of claim 1 wherein said seating ring is metal.

5. The rotary valve of claim 4 wherein said flanged seating section is hard coated.

6. The rotary valve of claim 5 wherein said flanged seating section is coated with an abradable break-in sealing layer.

7. The rotary valve of claim 4 wherein said seating ring is stainless steel.

8. The rotary valve of claim 4 wherein said seating ring is heat treated and tempered.

9. The rotary valve of claim 1 wherein said closure member comprises a spherical metal seating surface.

10. The rotary valve of claim 9 wherein said seating surface is hard coated.

11. The rotary valve of claim 10 wherein said seating surface is coated with an abradable break-in sealing layer.

12. The rotary valve of claim 1 wherein said seating ring support member is disposed between said flow-through section and said wall defining said flow passageway.

13. The rotary valve of claim 1 wherein said wave spring is disposed between said flow-through section and said wall defining said flow passageway.

14. The rotary valve of claim 13 wherein said valve housing has an annular notch encircling said flow passageway, said notch configured to receive said sealing member.

15. The rotary valve of claim 1 further comprising a retaining ring affixed to said valve housing in a manner to resist excessive axial movement of said seating ring.

16. A rotary valve comprising a valve housing having a wall defining a flow passageway, a closure member journalled within said valve housing and mounted for movement between a first position for permitting flow of fluid within said flow passageway and a second position for ceasing flow of fluid within said flow passageway, a flexible seating ring, disposed at least partially within said flow passageway in a position for sealing engagement with said closure member in said second position, said flexible seating ring comprising a flow-through section sized to fit within said flow passageway with a clearance fit, and a flanged seating section extending outwardly from said flow-through section and positioned for sealing contact with the closure member to seal the valve, a seating ring support member positioned to support said seating ring in a manner to permit said seating ring to move axially and radially within said flow passageway, when said rotary valve is assembled and in operation, to provide improved tolerance to dimensional variation in manufacture, and a distinct sealing member encircling said seating ring in a manner to resist leakage flow between said valve housing and said seating ring, said valve housing further defining an annular notch, encircling said flow passageway and configured to receive said sealing member, and a fill port in communication between said annular notch and the exterior of said valve housing for receiving a charge of liquified, curable composition to preload said sealing member against said seating ring.

17. The rotary valve of claim 1 wherein said seating ring and said sealing member are disposed relative to said closure member in a manner whereby differential fluid pressure serves to bias said flanged section against said closure member.

* * * * *

UNITED STATES PATENT AND TRADEMARK OFFICE
CERTIFICATE OF CORRECTION

PATENT NO.   : 5,478,047

DATED        : December 26, 1995

INVENTOR(S)  : William J. Best et al.

It is certified that error appears in the above-identified patent and that said Letters Patent is hereby corrected as shown below:

Col. 6, claim 1, line 18, "an" should be --and--.

Col. 8, claim 17, line 21 "1" should be --16--.

Signed and Sealed this

Twenty-ninth Day of October 1996

Attest:

BRUCE LEHMAN

Attesting Officer

Commissioner of Patents and Trademarks